US012718740B2

(12) United States Patent
Jang et al.

(10) Patent No.: US 12,718,740 B2
(45) Date of Patent: Aug. 25, 2026

(54) DISPLAY DEVICE AND DRIVING METHOD OF THE SAME

(71) Applicant: LG Display Co., Ltd., Seoul (KR)

(72) Inventors: Lae Bong Jang, Paju-si (KR); Yong Suk Kim, Paju-si (KR); Jun Park, Paju-si (KR); Byung Hee Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/931,951

(22) Filed: Oct. 30, 2024

(65) Prior Publication Data

US 2025/0218340 A1 Jul. 3, 2025

(30) Foreign Application Priority Data

Dec. 29, 2023 (KR) ........................ 10-2023-0197068

(51) Int. Cl.

*G09G 3/20* (2006.01)
*G09G 3/32* (2016.01)
*G09G 3/3233* (2016.01)

(52) U.S. Cl.

CPC ............. *G09G 3/2096* (2013.01); *G09G 3/32* (2013.01); *G09G 3/3233* (2013.01); *G09G 2330/06* (2013.01); *G09G 2370/10* (2013.01)

(58) Field of Classification Search

CPC ......... G09G 3/3225; G09G 2300/0426; G09G 3/20; G09G 3/2096; G09G 3/32; G09G 3/3233; G09G 2330/06; G09G 2370/10; H10D 86/471; H02M 3/335; H05K 3/00

See application file for complete search history.

(56) References Cited

U.S. PATENT DOCUMENTS

| | | | | |
|---|---|---|---|---|
| 10,128,764 B1 * | 11/2018 | Vinciarelli | ................ | H01F 3/10 |
| 2008/0081583 A1 * | 4/2008 | Zhang | ...................... | H03J 5/244<br>455/193.1 |
| 2024/0212563 A1 * | 6/2024 | Shao | .................... | G09G 3/2092 |

FOREIGN PATENT DOCUMENTS

| | | |
|---|---|---|
| KR | 101945463 B1 | 2/2019 |
| KR | 20210085073 A | 7/2021 |
| KR | 20220078882 A | 6/2022 |
| KR | 102475095 B1 | 12/2022 |

* cited by examiner

*Primary Examiner* — Michael A Faragalla

(74) *Attorney, Agent, or Firm* — Seed Intellectual Property Law Group LLP

(57) ABSTRACT

A display apparatus includes a first circuit board where a timing controller is disposed, a connector connected to the first circuit board, a second circuit board connected to the first circuit board, based on the connector, a controller disposed on the first circuit board to output a control signal, and a parasitic resonance control circuit configured to vary a parasitic value of the connector, based on the control signal output from the controller.

9 Claims, 14 Drawing Sheets

DISPLAY DEVICE AND DRIVING METHOD OF THE SAME

CROSS-REFERENCE TO RELATED APPLICATIONS

This application claims the benefit of the Korean Patent Application No. 10-2023-0197068 filed on Dec. 29, 2023, which is hereby incorporated by reference as if fully set forth herein.

BACKGROUND

Technical Field

The present disclosure relates to a display apparatus and a driving method thereof.

Description of the Related Art

As information technology advances, the market for display apparatuses which are connection mediums connecting a user with information is growing. Therefore, the use of display apparatuses such as light emitting display apparatuses, quantum dot display (QDD) apparatuses, and liquid crystal display (LCD) apparatuses is increasing.

The display apparatuses described above include a display panel which includes a plurality of subpixels, a driver which outputs a driving signal for driving the display panel, and a power supply which generates power which is to be supplied to the display panel or the driver.

In such display apparatuses, when the driving signal (for example, a scan signal and a data signal) is supplied to each of the subpixels provided in the display panel, a selected subpixel may transmit light or may self-emit light, and thus, an image may be displayed.

BRIEF SUMMARY

The present disclosure may allow an embedded point to point interface (EPI) frequency to be unsynchronized with a parasitic resonance frequency of a connector (for example, a cable) when transmitting a signal through an EPI interface, thereby minimizing an electromagnetic interference (EMI) problem. Also, the present disclosure may decrease EMI by using a resonance controller, and thus, may secure the degree of freedom in design for a length of the connector and may remove a subsidiary material such as a fixing tape, thereby reducing the manufacturing cost.

To achieve these technical features and other characteristics and in accordance with the purpose of the disclosure, as embodied and broadly described herein, a display apparatus includes a first circuit board where a timing controller is disposed, a connector connected to the first circuit board, a second circuit board connected to the first circuit board, based on the connector, a controller disposed on the first circuit board to output a control signal, and a parasitic resonance control circuit configured to vary a parasitic value of the connector, based on the control signal output from the controller.

The controller may control a voltage applied to the parasitic resonance control circuit to vary at least one of a parasitic resonance frequency of the connector and a parasitic resonance magnitude of the connector.

The parasitic resonance control circuit may include at least one of a first parasitic resonance control circuit including a varactor diode where a capacitance varies and a second parasitic resonance control circuit including a field effect transistor (FET) operating as a resistor in a deep triode region.

The controller may be configured as a sensing type which senses a voltage from a conductor disposed at a periphery of the connector to obtain a sensing value and outputs the control signal, based on the obtained sensing value, or the controller may be configured as a non-sensing type which outputs the control signal as random bits.

The controller may sense a voltage from at least one of a low voltage electrode part and a ground pad part disposed at a periphery of the connector to obtain a sensing value.

The parasitic resonance control circuit may be disposed at both ends of a pad part on which the connector is attached in the first circuit board.

The ground pad part may be disposed in an island shape to be isolated from a ground electrode disposed in the first circuit board.

The ground pad part may be disposed in a first layer of the first circuit board, and the low voltage electrode part may be disposed in a second layer of the first circuit board.

The first circuit board may include a pattern portion formed by removing a metal layer disposed in a second layer of the first circuit board, based on a region where the pad part is formed.

In another aspect of the present disclosure, a driving method of a display apparatus, including a first circuit board where a timing controller is disposed, a connector connected to the first circuit board, a second circuit board connected to the first circuit board, based on the connector, a controller disposed on the first circuit board to output a control signal, and a parasitic resonance control circuit configured to vary a parasitic value of the connector, based on the control signal output from the controller, includes: analyzing a noise level, based on the sensing value; when the noise level is higher than a threshold value, determining that the parasitic value of the connector does not correspond to an avoidable control value, and changing the control signal; and when the noise level is lower than the threshold value, determining that the parasitic value of the connector corresponds to the avoidable control value, and fixing the control signal.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Hereinafter, the present disclosure will be described more fully with reference to the accompanying drawings, in which exemplary embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

A display apparatus according to the present disclosure may be applied to televisions (TVs), video players, personal computers (PCs), home theaters, electronic devices for vehicles, and smartphones, but is not limited thereto. The display apparatus according to the present disclosure may be implemented as a light emitting display apparatus, a quantum dot display (QDD) apparatus, or a liquid crystal display (LCD) apparatus. Hereinafter, for convenience of description, a light emitting display apparatus self-emitting light by using an inorganic light emitting diode or an organic light emitting diode will be described for example.

Figure 1:
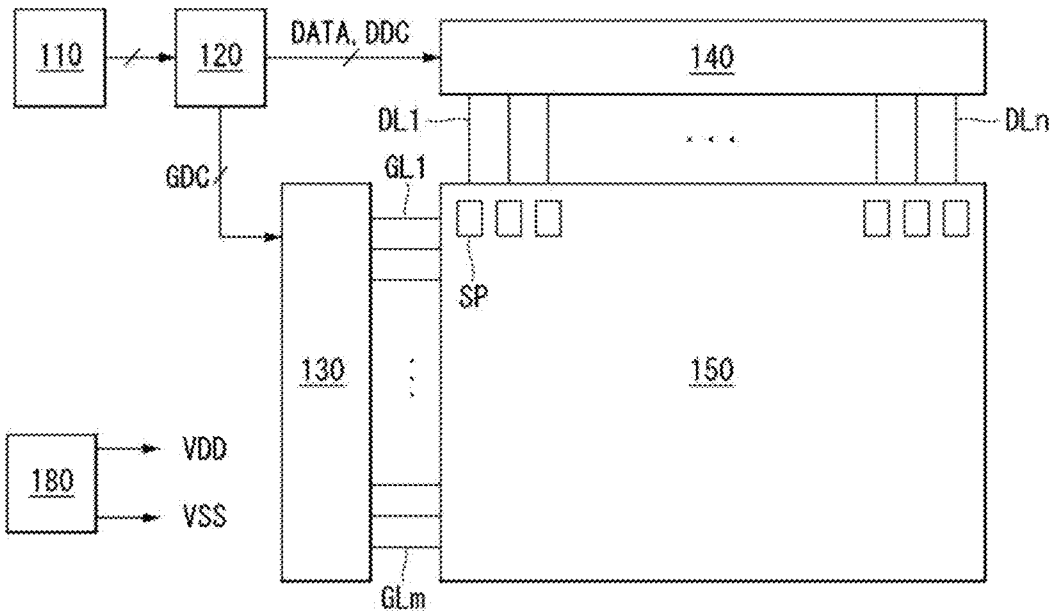
FIG. 1 is a block diagram schematically illustrating a light emitting display apparatus.
Figure 2:
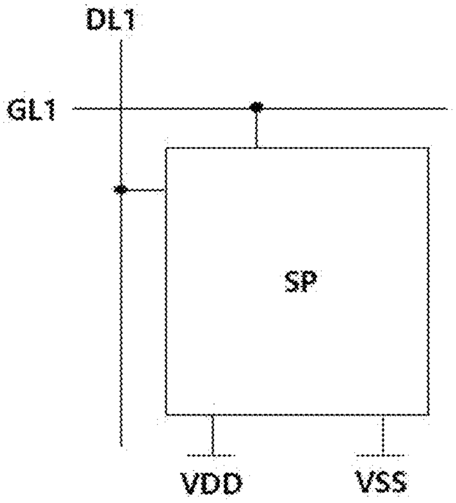
FIG. 2 is a diagram schematically illustrating a subpixel illustrated in FIG. 1.

FIG. 1 is a block diagram schematically illustrating a light emitting display apparatus, and FIG. 2 is a diagram schematically illustrating a subpixel illustrated in FIG. 1.

As illustrated in FIGS. 1 and 2, a light emitting display apparatus according to an embodiment of the present disclosure may include a timing controller 120, a scan driver 130, a data driver 140, a display panel 150, and a power supply 180.

A supply unit 110 (a set or a host system) may output a video data signal supplied from the outside or an image data signal stored in an internal memory thereof. The video supply unit 110 may supply a data signal and the various driving signals to the timing controller 120.

The timing controller 120 may output a gate timing control signal GDC for controlling an operation timing of the scan driver 130, a data timing control signal DDC for controlling an operation timing of the data driver 140, and various synchronization signals (a vertical synchronization signal Vsync and a horizontal synchronization signal Hsync). The timing controller 120 may provide the data driver 140 with the data timing control signal DDC and a data signal DATA supplied from the video supply unit 110. The timing controller 120 may be implemented as an integrated circuit (IC) type and may be mounted on a printed circuit board (PCB), but is not limited thereto.

The scan driver 130 may output a scan signal (or a scan voltage) in response to the gate timing control signal GDC supplied from the timing controller 120. The scan driver 130 may supply the scan signal to a plurality of subpixels, included in the display panel 150, through a plurality of gate lines GL1 to GLm. The scan driver 130 may be implemented as an IC type or may be directly provided on the display panel 150 in a gate in panel (GIP) type, but is not limited thereto.

In response to the data timing control signal DDC supplied from the timing controller 120, the data driver 140 may sample and latch the data signal DATA, convert a digital data signal into an analog data voltage on the basis of a gamma reference voltage, and output the analog data voltage. The data driver 140 may respectively supply data voltages to the subpixels of the display panel 150 through a plurality of data lines DL1 to DLn. The data driver 140 may be implemented as an IC type or may be mounted on the display panel 150 or a PCB, but is not limited thereto.

The power supply 180 may generate a first power having a high level and a second power having a low level, based on an external input voltage supplied from the outside, and may output the first voltage and the second voltage through a first power line EVDD and a second power line EVSS. The power supply 180 may generate and output a voltage (for example, a gate voltage including a gate high voltage and a gate low voltage) needed for driving of the scan driver 130 or a voltage (a drain voltage including a drain voltage and a half drain voltage) needed for driving of the data driver 140, in addition to the first power and the second power.

The display panel 150 may display an image, based on the first power, the second power, and a driving signal including the scan signal and a data voltage. The subpixels of the display panel 150 may each self-emit light. The display panel 150 may be manufactured based on a substrate, having stiffness or flexibility, such as glass, silicon, or polyimide. Also, the subpixels emitting light may include pixels including red, green, and blue, or may include pixels including red, green, blue, and white.

For example, one subpixel SP may be connected to a first data line DL1, a first gate line GL1, the first power line EVDD, and the second power line EVSS and may include a pixel circuit which includes a switching transistor, a driving transistor, a capacitor, and an organic light emitting diode. The subpixel SP used in the light emitting display apparatus may self-emit light, and thus, a configuration of a circuit may be complicated. Also, an organic light emitting diode emitting light and a compensation circuit compensating for a degradation in a driving transistor supplying a driving current needed for driving of the organic light emitting diode may be variously implemented. Accordingly, the subpixel SP is simply illustrated as a block type.

Hereinabove, each of the timing controller 120, the scan driver 130, and the data driver 140 has been described as an individual element. However, based on an implementation type of the light emitting display apparatus, one or more of the timing controller 120, the scan driver 130, and the data driver 140 may be integrated into one IC.

Figure 3:
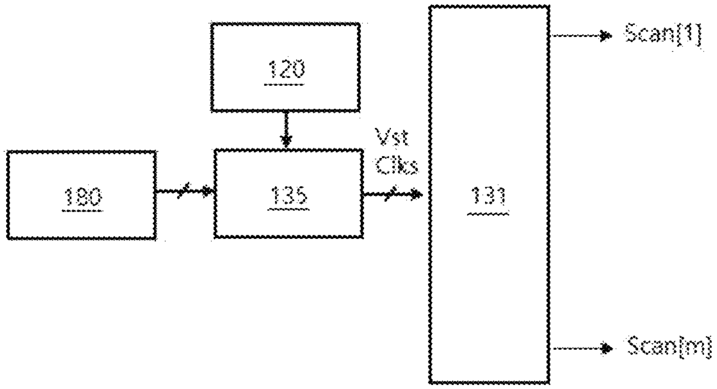
FIGS. 3 and 4 are diagrams for describing a configuration of a gate in panel (GIP)-type scan driver.
Figure 4:
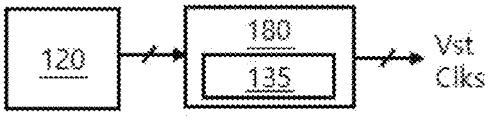
Figure 5:
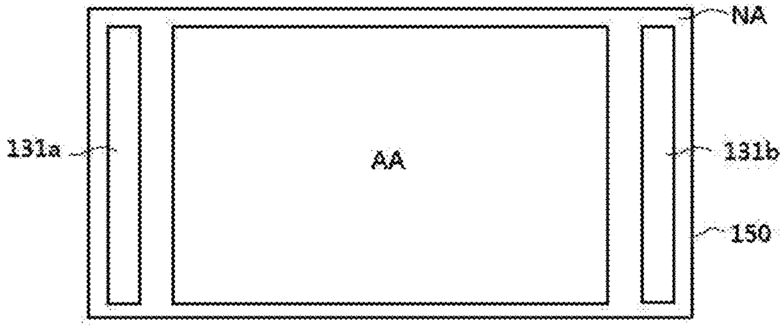
FIG. 5 is a diagram illustrating an arrangement example of the GIP-type scan driver.

FIGS. 3 and 4 are diagrams for describing a configuration of a GIP-type scan driver, and FIG. 5 is a diagram illustrating an arrangement example of the GIP-type scan driver.

As illustrated in FIG. 3, a GIP-type scan driver 130 may include a shift register 131 and a level shifter 135. The level shifter 135 may generate scan clock signals Clks and a start signal Vst, based on signals and voltages output from the timing controller 120 and the power supply 180.

The shift register 131 may operate based on the clock signals Clks and the start signal Vst output from the level shifter 135 and may output scan signals Scan[1] to Scan[m] for turning on or off a transistor formed in the display panel. The shift register 131 may be formed as a thin film type in the display panel, based on a GIP type.

As illustrated in FIGS. 3 and 4, the level shifter 135 may be independently provided as an IC type unlike the shift register 131, or may be included in the power supply 180. However, this may be merely an embodiment, and embodiments of the present disclosure are not limited thereto.

As illustrated in FIG. 5, shift registers 131*a* and 131*b* outputting scan signals in the GIP-type scan driver may be disposed in a non-display area NA of the display panel 150. The shift registers 131*a* and 131*b* may be disposed in left and right non-display areas NA of the display panel 150, but are not limited thereto.

Figure 6:
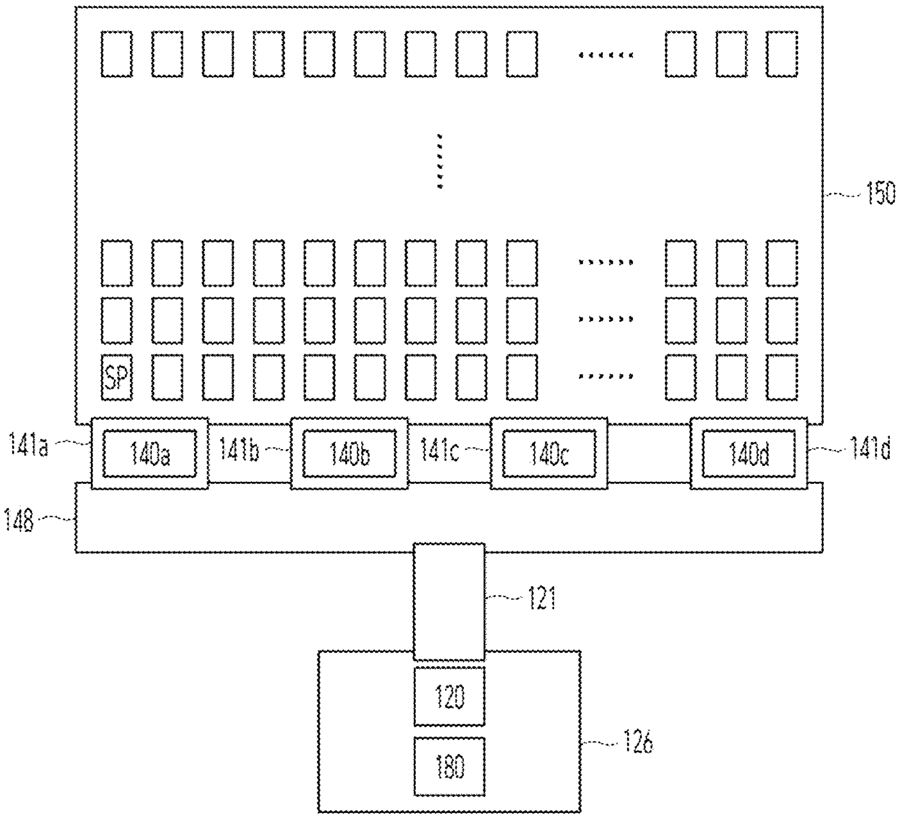
FIG. 6 is an exemplary diagram where the light emitting display apparatus illustrated in FIG. 1 is modularized.
Figure 7:
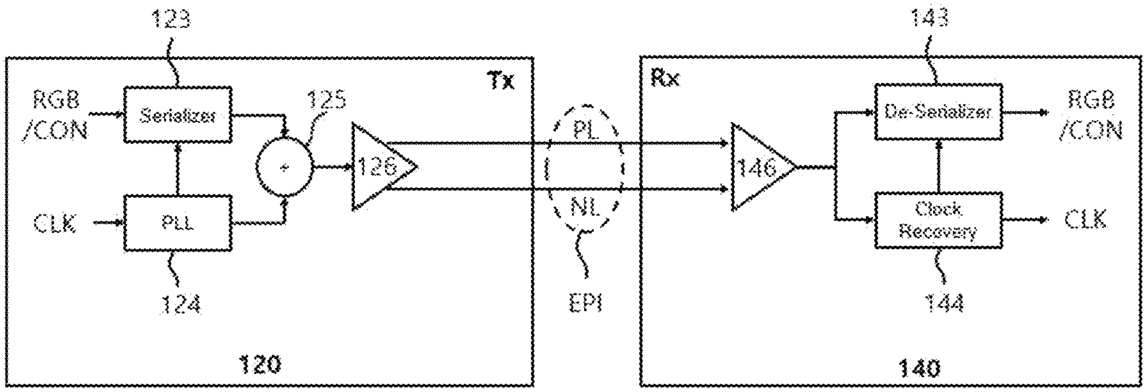
FIG. 7 is a diagram for describing a communication scheme provided between a timing controller and a data driver.

FIG. 6 is an exemplary diagram where the light emitting display apparatus illustrated in FIG. 1 is modularized, and FIG. 7 is a diagram for describing a communication scheme provided between a timing controller and a data driver.

As illustrated in FIG. 6, the light emitting display apparatus may include a display panel 150, a plurality of data drivers 140*a* to 140*d*, a timing controller 120, and a power supply 180. The light emitting display apparatus may differ in modularization type, based on an application target and a size of a display panel. Also, FIG. 6 is an example where the light emitting display apparatus is modularized.

For example, the timing controller 120 and the power supply 180 may be disposed on a first circuit board 126. The first circuit board 126 may be connected to a second circuit board 148, based on a first connector 121 such as a cable. The plurality of data drivers 140*a* to 140*d* may be disposed on a plurality of third circuit boards 141*a* to 141*d*. The display panel 150 and the second circuit board 148 may be electrically connected to each other by the plurality of third circuit boards 141*a* to 141*d*. However, this may be merely an embodiment, and the present disclosure is not limited thereto.

As illustrated in FIG. 7, a timing controller 120 and a data driver 140 may transfer and receive a data signal and a control signal therebetween, based on a communication scheme. To this end, a data transmitter Tx may be included in the timing controller 120, and a data receiver Rx may be included in the data driver 140. Hereinafter, in a case where the timing controller 120 and the data driver 140 transfer and receive a signal therebetween, based on a communication interface such as an EPI interface EPI, an example of a relevant configuration will be described.

The data transmitter Tx included in the timing controller 120 may include a first data processor 123, a clock adjuster 124, a signal synthesizer 125, and a transfer buffer unit 126.

The first data processor 123 may perform data processing on various control signals CNS and an RGB data signal RGB, which are to be output from the timing controller 120, in the form capable of serial transmission. To this end, the first data processor 123 may include a serializer.

The clock adjuster 124 may adjust a clock signal CLK so that the RGB data signal RGB and the various control signals CNS to be output from the timing controller 120, based on an appropriate clock signal CLK. To this end, the clock adjuster 124 may include a phase-locked loop (PLL).

The signal synthesizer 125 may synthesize the RGB data signal RGB, the various control signals CNS, and the clock signal CLK, output from the first data processor 123, in the form of data packets. To this end, the signal synthesizer 125 may include a first input terminal connected to an output terminal of the first data processor 123, a second input terminal connected to an output terminal of the clock adjuster 124, and an output terminal connected to an input terminal of the transfer buffer unit 126.

The transfer buffer unit 126 may transfer a data packet, output from the signal synthesizer 125, through an EPI interface EPI connected to the data driver 140. To this end, the transfer buffer unit 126 may include a first terminal connected to a first transfer line PL of the EPI interface EPI and a second terminal connected to a second transfer line NL. That is, the transfer buffer unit 126 may be connected to a pair of transfer lines PL and NL.

The data driver 140 may include a reception buffer unit 146, a second data processor 143, and a clock recovery unit 144.

The reception buffer unit 146 may receive the data packet transferred through the EPI interface EPI connected to the timing controller 120. To this end, the reception buffer unit 146 may include a first terminal connected to the first transfer line PL of the EPI interface EPI and a second terminal connected to the second transfer line NL.

The second data processor 143 may perform de-serialization for extraction the RGB data signal RGB and the various control signals CNS in a serial data packet transferred through the reception buffer unit 146. To this end, the second data processor 143 may include a de-serializer.

The clock recovery unit 144 may extract or recover the clock signal CLK in the serial data packet transferred through the reception buffer unit 146.

In FIG. 7, only a pair where the signal transfer line includes the first transfer line PL and the second transfer line NL is illustrated for helping basic understanding associated with the EPI interface EPI, but is not limited thereto and may be provided in plurality.

As seen in FIG. 6, in a case where the timing controller 120 and the data driver 140 transfer a signal by using the EPI interface EPI, the timing controller 120 and the data driver 140 may transfer and receive a signal therebetween, based on the first connector 121 such as a cable. The first connector 121 may have a parasitic value (a parasitic resonance frequency) based on a unique parasitic component. Due to this, when a parasitic resonance frequency is equal to a frequency (hereinafter referred to as an EPI frequency) which is used when transferring a signal, an EMI problem may occur due to an increase in radiation magnitude, and thus, it may be required to solve such a problem.

Figure 8:
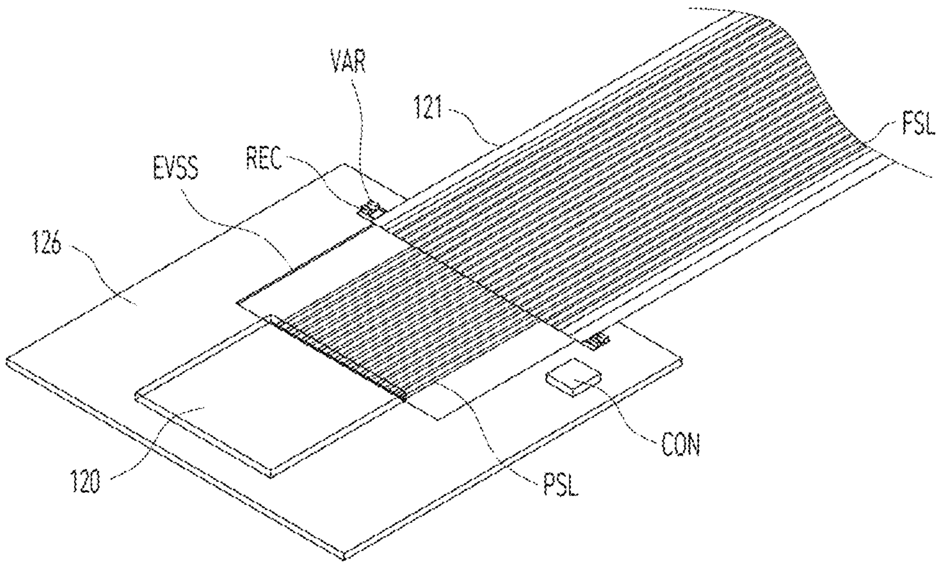
FIGS. 8 and 9 are diagrams schematically illustrating a resonance controller according to an embodiment and relevant elements.
Figure 9:
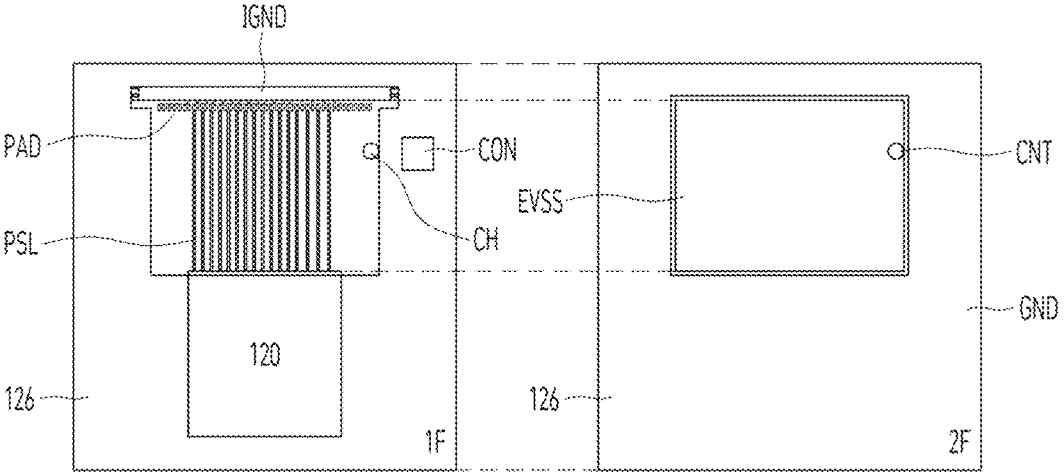
Figure 10:
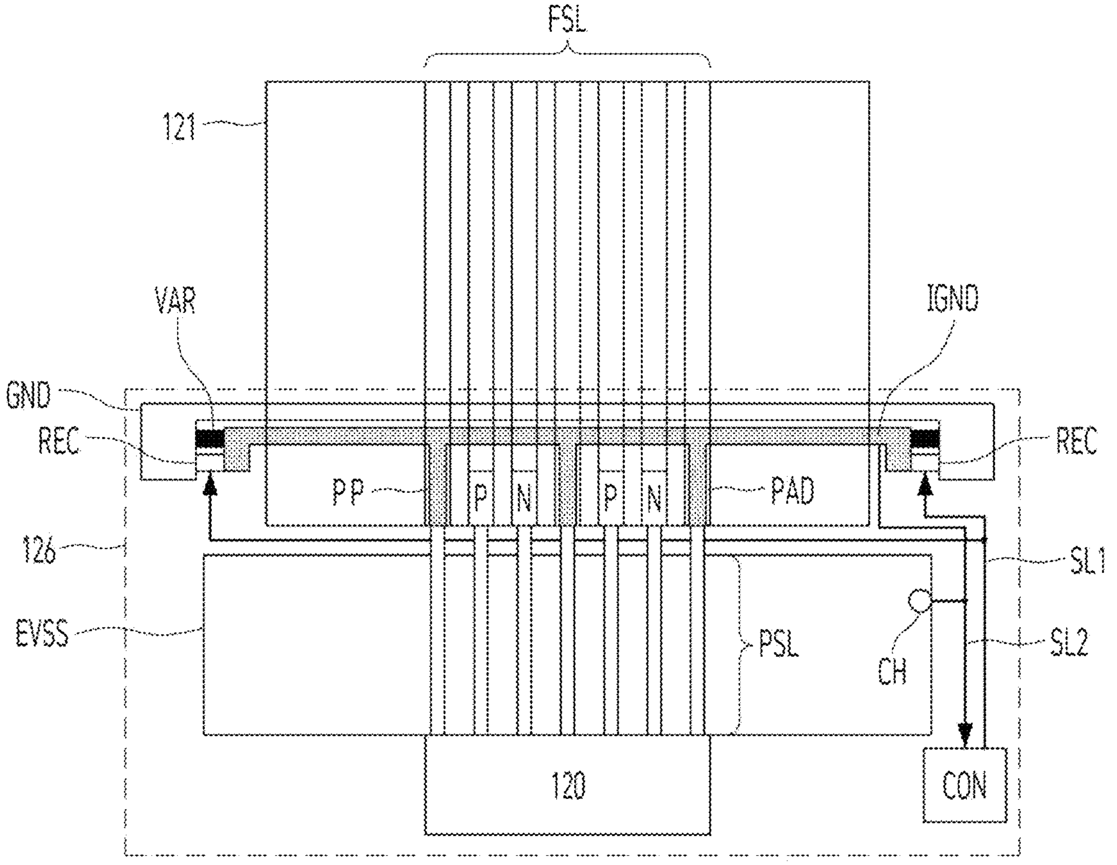
FIG. 10 is a diagram illustrating in more detail the resonance controller according to an embodiment and relevant elements.
Figure 11:
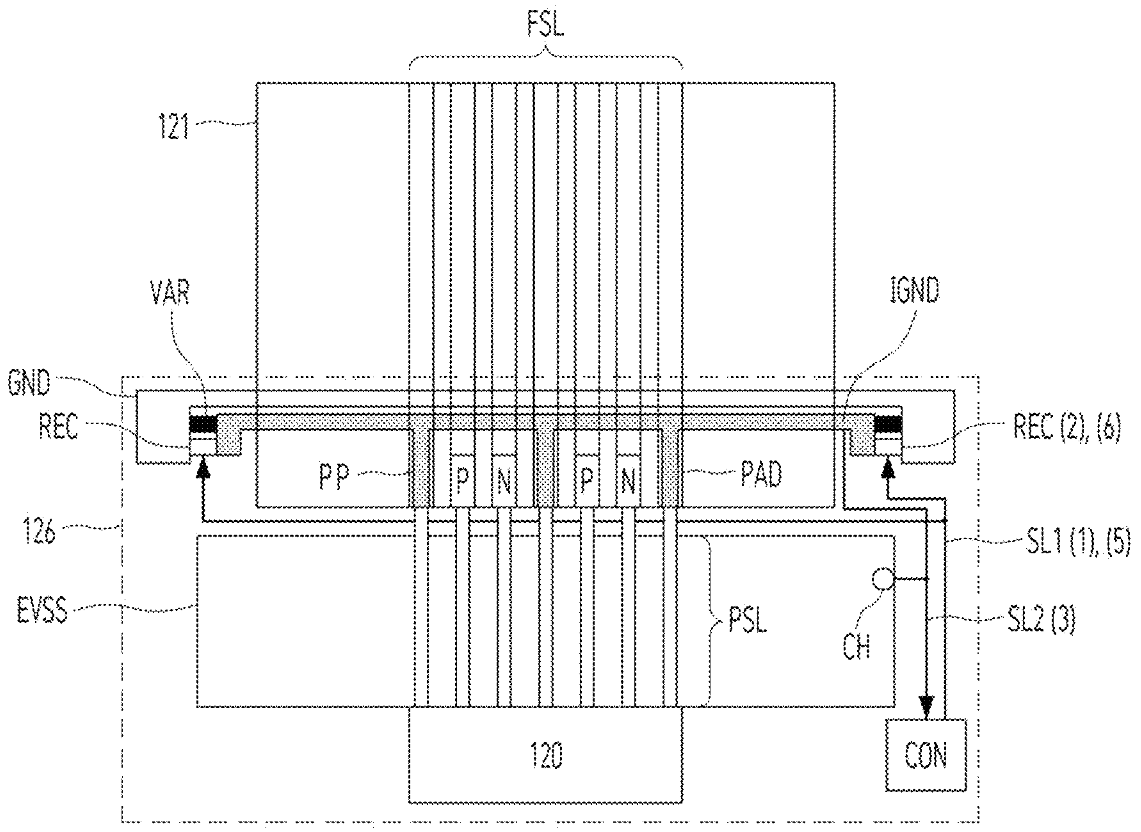
FIGS. 11 and 12 are diagrams for describing a resonance control method using the resonance controller according to an embodiment.
Figure 12:
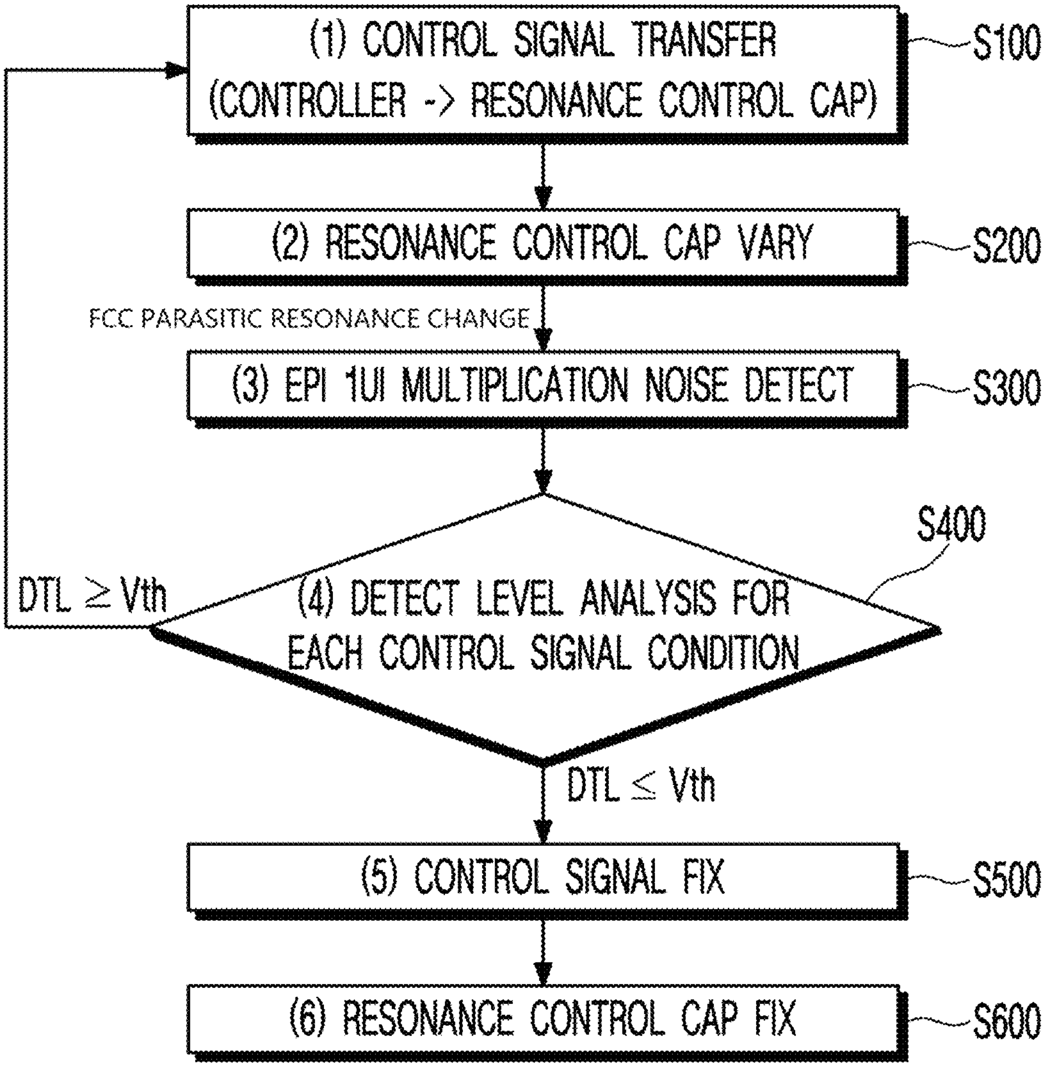

FIGS. 8 and 9 are diagrams schematically illustrating a resonance controller according to an embodiment and relevant elements, FIG. 10 is a diagram illustrating in more detail the resonance controller according to an embodiment and relevant elements, and FIGS. 11 and 12 are diagrams for describing a resonance control method using the resonance controller according to an embodiment.

As illustrated in FIGS. 8 and 9, a resonance controller CON, REC, VAR, and EVSS according to an embodiment may be provided on a first circuit board 126 where a timing controller 120 is provided. The resonance controller CON, REC, VAR, and EVSS may include a controller CON, a low voltage electrode part EVSS, a first circuit unit REC, and a second circuit unit VAR. The first circuit unit REC and the second circuit unit VAR can be defined as a parasitic resonance control circuit.

The timing controller 120 disposed on the first circuit board 126 may be connected to a signal line PSL. The signal line PSL may be connected to a pad part PAD disposed on the first circuit board 126. The first connector 121 may include a transfer line FSL which is connected to pads included in the pad part PAD and lines for transferring signals.

The low voltage electrode part EVSS may be disposed under the signal line PSL which electrically connects the timing controller 120 to the pad part PAD. The low voltage electrode part EVSS may be disposed in a second layer 2F, instead of a first layer 1F, of the first circuit board 126 where the timing controller 120 and the like are disposed and may be formed in a tetragonal island shape so as to be isolated from a ground electrode GND included in the first circuit board 126. A contact portion CNT of the low voltage electrode part EVSS formed in the second layer 2F may be exposed through a contact hole CH formed in the first layer 1F of the first circuit board 126. The controller CON may be connected to the low voltage electrode part EVSS through the contact portion CNT.

The first circuit unit REC may be disposed at both ends of the pad part PAD. The first circuit unit REC may vary a capacitance of a resonance control capacitor, based on a signal output from the controller CON. The first circuit unit REC may control a parasitic resonance frequency of the first connector 121, based on a capacitor.

The second circuit unit VAR may be adjacent to the first circuit unit REC and may be disposed at the two ends of the pad part PAD. The second circuit unit VAR may control a parasitic resonance magnitude (amplitude) of the first connector 121, based on a resistance.

In the above description, an example where the first circuit board 126 includes the first layer 1F and the second layer 2F has been described. However, the first circuit board 126 may be configured as two layers or four layers.

As illustrated in FIG. 10, a ground pad part IGND having an island shape may be disposed between the first circuit unit REC and the second circuit unit VAR, which are disposed at the two ends of the pad part PAD. The ground pad part IGND may be disposed in the first layer of the first circuit unit 126. The ground pad part IGND may be disposed to be isolated from the ground electrode GND disposed in the first layer of the first circuit board 126 and may be arranged in a second direction (a horizontal direction) intersecting with the transfer line FSL included in the first connector 121. Also, the ground pad part IGND may include a protrusion portion PP which protrudes in a first direction (a vertical direction) and extends up to the pad part PAD, so that shielding is performed for each transfer line pair (P, N) in the transfer line FSL included in the first connector 121.

The controller CON may include a first control line SL1 for outputting a control signal and a second control line SL2 for obtaining a sensing value. A first control line SL1 may be selectively connected to at least one of the first circuit unit REC and the second circuit unit VAR. A second control line SL2 may be selectively connected to at least one of the low voltage electrode part EVSS and the ground pad part IGND.

The controller CON may sense a voltage from at least one of the low voltage electrode part EVSS and the ground pad part IGND through the second control line SL2 to obtain a sensing value. The controller CON may analyze a noise level of an EPI frequency, based on the sensing value, and may provide a control value for avoiding the parasitic resonance frequency of the first connector 121. The controller CON may output a control signal for controlling at least one of the first circuit unit REC and the second circuit unit VAR, based on the control value.

In FIG. 10, an example where the controller CON and the timing controller 120 are provided as separate elements is illustrated. However, the controller CON may be included in the timing controller 120. Furthermore, the ground electrode GND, the low voltage electrode part EVSS, and the ground pad part IGND may be formed of a conductor such as copper and may be patterned.

As illustrated in FIGS. 11 and 12, the controller CON may transfer a control signal Control to the first circuit unit REC so as to control a resonance control capacitor Cap included in the first circuit unit REC (S100). The first circuit unit REC may vary a capacitance of the resonance control capacitor Cap, based on the control signal Control (S200). When the capacitance of the resonance control capacitor Cap varies, a parasitic resonance frequency of the first connector 121 may be changed.

The method may sense a voltage from at least one of the low voltage electrode part EVSS and the ground pad part IGND to obtain a sensing value and may detect noise of an EPI frequency (EPI 1UI multiplication noise detect), based on the sensing value (S300). In FIG. 12, an example where noise of an EPI frequency multiplies 1UI (unit interval: smallest unit in data flow) is illustrated, but an embodiment is not limited thereto.

The method may vary the control signal for each condition, based on the sensing value, and may analyze a detected noise level DTL (S400). At this time, when the detected noise level DTL is higher than an internally predetermined threshold value Vth (DTL≥Vth), the method may determine that a control value of a current control signal and a capacitance of a resonance control capacitor Cap corresponding thereto do not correspond to a control value for avoiding the parasitic resonance frequency of the first connector 121 and may repeat preceding steps. On the other hand, when the detected noise level DTL is lower than the internally predetermined threshold value Vth (DTL<Vth), the method may determine that the control value of the current control signal and the capacitance of the resonance control capacitor Cap corresponding thereto correspond to the control value for avoiding the parasitic resonance frequency of the first connector 121 and may fix the control signal Control (S500).

The controller CON may output the control signal Control provided based on the control value for avoiding the parasitic resonance frequency of the first connector 121 to fix the capacitance of the resonance control capacitor Cap (S600).

Figure 13:
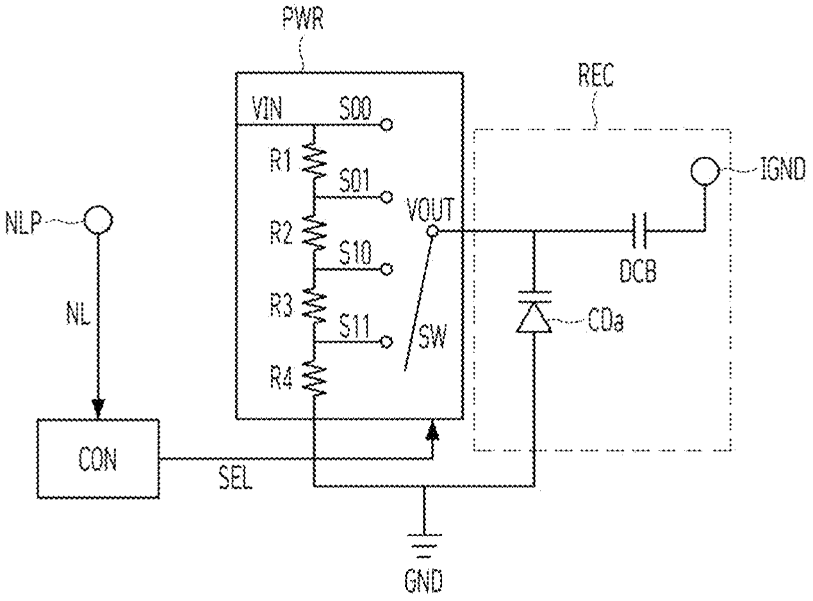
FIG. 13 is a diagram illustrating a circuit configuration of a resonance controller according to a first embodiment of an embodiment.
Figure 14:
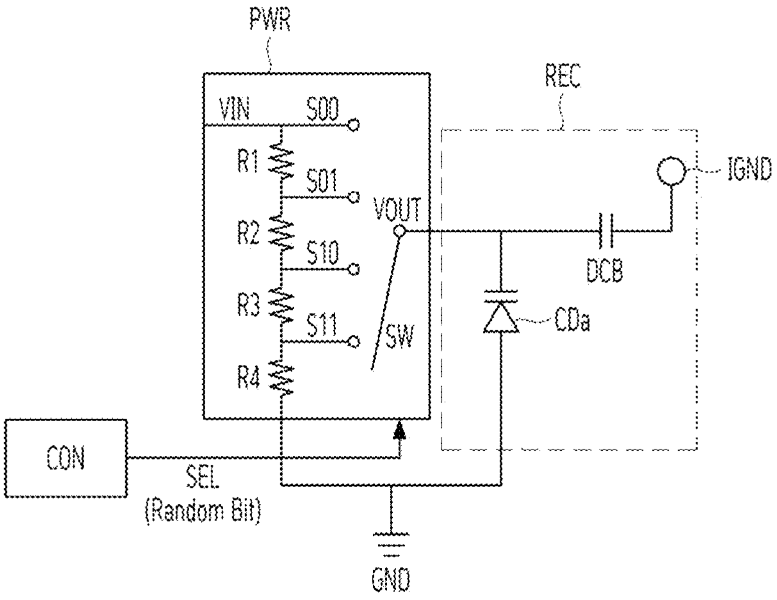
FIG. 14 is a diagram illustrating a circuit configuration of a resonance controller according to a second embodiment of an embodiment.

FIG. 13 is a diagram illustrating a circuit configuration of a resonance controller according to a first embodiment of an embodiment, and FIG. 14 is a diagram illustrating a circuit configuration of a resonance controller according to a second embodiment of an embodiment.

As illustrated in FIG. 13, the resonance controller according to the first embodiment may include a controller CON, a voltage adjuster PWR, and a first circuit unit REC. The controller CON may obtain a noise level NL from a noise level sensing point NLP. The noise level sensing point NLP may be at least one of the low voltage electrode part EVSS and the ground pad part IGND illustrated in FIG. 1. The controller CON may generate a control signal SEL for controlling the voltage adjuster PWR, based on the noise level NL. For example, the control signal SEL may be output in the form of 2 bits including 00 to 11.

The voltage adjuster PWR may operate based on the control signal SEL output from the controller CON and may vary an input voltage input through an input terminal VIN to output through an output terminal VOUT. The voltage adjuster PWR may include a switch SW and resistors R1 to R4 serially connected between the input terminal VIN and a ground terminal GND. The switch SW may connect the output terminal VOUT to at least one of nodes S00, S01, S10, and S11 of the resistors R1 to R4 serially connected to one another, based on the control signal SEI for varying the input voltage input through the input terminal VIN to output through the output terminal VOUT.

The first circuit unit REC may vary a capacitance of a resonance control capacitor CDa to control the parasitic resonance frequency of the first connector, based on an output voltage output from the voltage adjuster PWR.

The resonance control capacitor CDa may include a first electrode connected to the ground terminal GND of the voltage adjuster PWR and a second electrode connected to the output terminal VOUT of the voltage adjuster PWR. The resonance control capacitor CDa may be selected as a varactor diode which has a capacitor characteristic and has a capacitance which varies based on a level of an applied voltage, but is not limited thereto.

A direct current (DC) block capacitor DCB may include a first electrode connected to the output terminal VOUT of the voltage adjuster PWR and a second electrode connected to the noise level sensing point NLP. The DC block capacitor DCB may prevent a DC component from flowing in from the noise level sensing point NLP. To this end, a capacitance of the DC block capacitor DCB may be higher than that of the resonance control capacitor CDa, but is not limited thereto.

The resonance controller according to the first embodiment may have a structure (a sensing type) which obtains a noise level NL from the noise level sensing point NLP and provides a control value for avoiding the parasitic resonance frequency of the first connector, based on whether a detected noise level is higher or lower than the internally predetermined threshold value. However, the resonance controller may provide the control value for avoiding the parasitic resonance frequency of the first connector despite being implemented in a structure (a non-sensing type) which does not obtain the noise level NL from the noise level sensing point NLP. This may be as illustrated in FIG. 14.

The resonance controller according to the second embodiment illustrated in FIG. 14, like the resonance controller according to the first embodiment, may include a controller CON, a voltage adjuster PWR, and a first circuit unit REC. According to the second embodiment, the controller CON may output a control signal SEL in the form of random bits, and based thereon, may distribute the parasitic resonance frequency of the first connector. Also, an example may be described where the controller CON randomly outputs one of 00 to 11, based on elements included in the voltage adjuster PWR, but an embodiment is not limited thereto.

Figure 15:
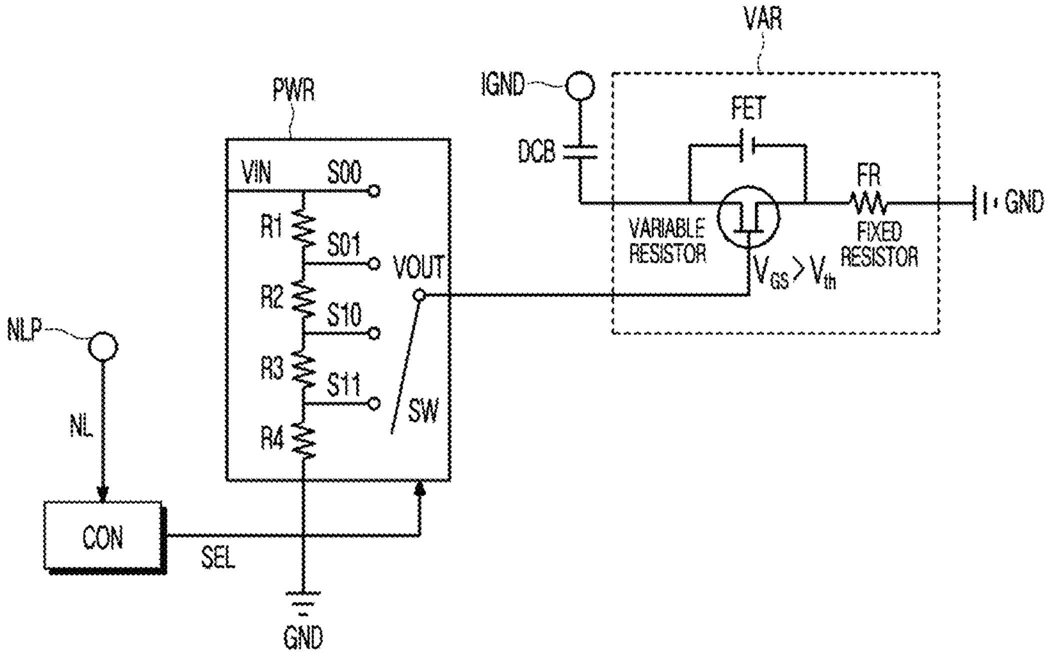
FIG. 15 is a diagram illustrating a circuit configuration of a resonance controller according to a third embodiment of an embodiment.
Figure 16:
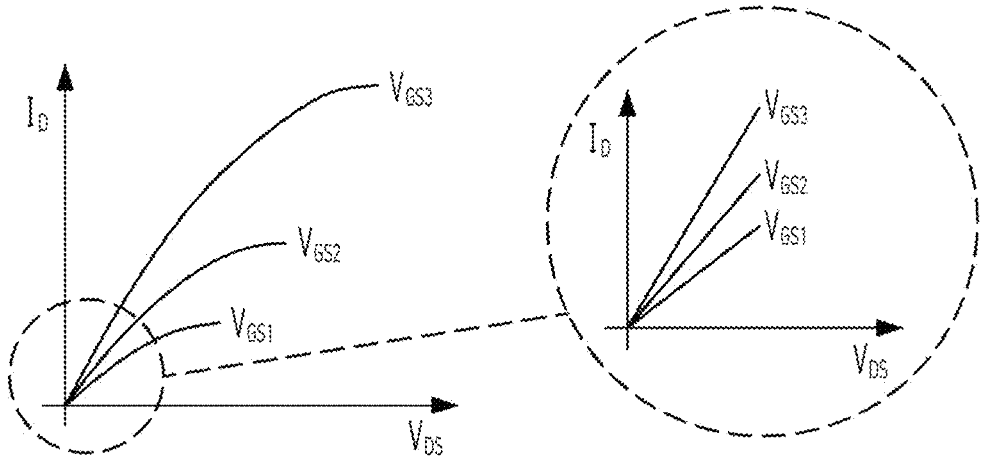
FIG. 16 is an exemplary diagram illustrating a period where a field effect transistor (FET) illustrated in FIG. 15 operates like a resistor.

FIG. 15 is a diagram illustrating a circuit configuration of a resonance controller according to a third embodiment of an embodiment, and FIG. 16 is an exemplary diagram illustrating a period where a field effect transistor (FET) illustrated in FIG. 15 operates like a resistor.

As illustrated in FIG. 15, the resonance controller according to the third embodiment may include a controller CON, a voltage adjuster PWR, and a second circuit unit VAR. The controller CON and the voltage adjuster PWR may be as described in the first embodiment, and thus, the second circuit unit VAR may be mainly described.

The second circuit unit VAR may be connected to a ground pad part IGND through a DC block capacitor DCB. The second circuit unit VAR may vary a resistance value based on an output voltage output based on a control signal SEL output from the controller CON so that a parasitic resonance magnitude varies.

The second circuit unit VAR may include an FET and a fixed resistor FR. The FET may include a gate electrode connected to an output terminal VOUT of the voltage adjuster PWR, a first electrode connected to a second electrode of the DC block capacitor DCB, and a second electrode connected to one end of the fixed resistor FR. The fixed resistor FR may include the one end connected to the second electrode of the FET and the other end connected to a ground terminal GND.

As see in a circle defined by a dotted line in FIG. 16, the FET may operate like a resistor as a channel resistance increases in a deep triode region which is a period where a slope is very linear in the deep triode region. That is, VGS of the FET may vary based on a variation of an output voltage output through the output terminal VOUT of the voltage adjuster PWR, and the FET may be used as a variable resistor where a resistance value varies with respect to a specific voltage.

The resonance controller according to the third embodiment may have a structure which varies a parasitic resonance magnitude, based on the second circuit unit VAR for varying a resistance value.

The resonance controller according to an embodiment may decrease EMI, based on the resonance controller illustrated in FIG. 13 or 14 and the resonance controller illustrated in FIG. 15, and thus, may secure the degree of freedom in design for a length of a connector. Also, a subsidiary material such as a fixing tape attached on the connector for reducing EMI may be removed, thereby reducing the manufacturing cost.

FIGS. 17 to 20 are diagrams for describing a control method using a resonance controller according to an embodiment.

Figure 17:
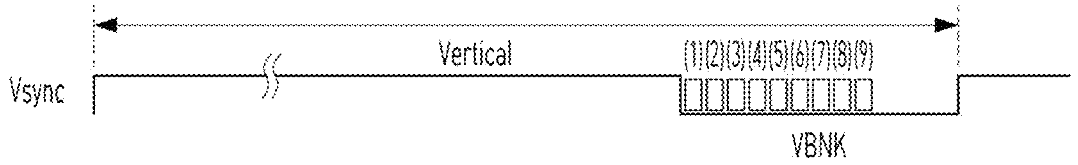
FIGS. 17 to 20 are diagrams for describing a control method using a resonance controller according to an embodiment.

As illustrated in FIG. 17, the resonance controller may operate during a blank period VBNK of a vertical signal period Vertical and the blank period VBNK configuring a synchronization signal Vsync. For example, the resonance controller may finally set a control signal through a process of (1) period to (9) period of the blank period VBNK. This may be shown in the following Table 1.

TABLE 1

| | | |
|---|---|---|
| (1) | Control signal output under condition 1 | (1Packet) |
| (2) | Noise level detection and ADC processing under condition 1 | |
| (3) | Control signal output under condition 2 | (1Packet) |
| (4) | Noise level detection and ADC processing under condition 2 | |
| (5) | Control signal output under condition 3 | (1Packet) |
| (6) | Noise level detection and ADC processing under condition 3 | |
| (7) | Control signal output under condition 4 | |
| (8) | Noise level detection and ADC processing under condition 4 | |
| (9) | Set control signal with respect to minimum noise level among conditions 1 to 4 | |

Figure 18:
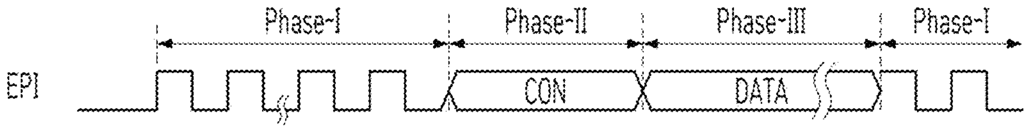

As illustrated in FIGS. 17 and 18, the timing controller 120 may transfer a data package having a system of a first phase (Phase-I), a second phase (Phase-II), and a third phase (Phase-III) through the EPI interface EPI connected to the data driver 140.

The first phase (Phase-I) may be a period where a clock training pattern is transferred so that the clock recovery unit 144 included in the data driver 140 extracts or recovers a normal and stable clock signal CLK. The second phase (Phase-II) may be a period where a control signal CON for controlling an apparatus included in the data driver 140 is transferred. The third phase (Phase-III) may be a period where an RGB data signal RGB is transferred to the data driver 140. Accordingly, the first phase (Phase-I) and the second phase (Phase-II) may be transferred during a blank period where a display panel does not display an image, and the third phase (Phase-III) may be transferred during an active period where the display panel displays an image.

The first phase (Phase-I) may be defined as a period which is provided for configuring a transfer line for stably transferring and receiving a signal between a timing controller and a data driver. The timing controller and the data driver may perform an operation for optimizing an interface during the first phase (Phase-I), based on various environment variables (a case where power is applied to an apparatus, a case where a line is unstable, etc.), and this period may be used as a driving period of a resonance controller.

Figure 19:
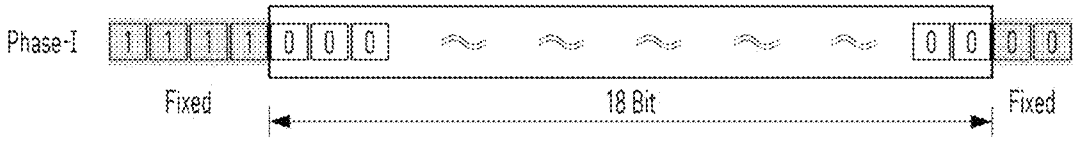
Figure 20:
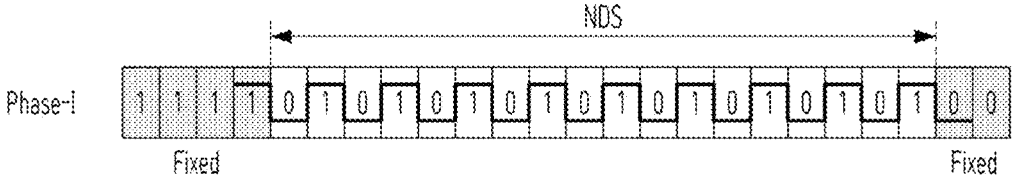

As illustrated in FIG. 19, the first phase (Phase-I) may include a fixed period (Fixed) which is fixed like "1111" and "00" and an unfixed period (18 bits: an embodiment is not limited to 18 bits) which is not fixed (changeable) like "000~~~~~~00." An embodiment may transfer a signal to an unfixed period of the first phase (Phase-I) so as to be used as a driving period of the resonance controller. For example, as in FIG. 20, an embodiment may arbitrarily generate a periodic noise signal NDS (a signal capable of detecting a noise level) corresponding to 1UI where 0 and 1 are repeated and may then transfer the periodic noise signal NDS an unfixed period of the first phase (Phase-I).

Figure 21:
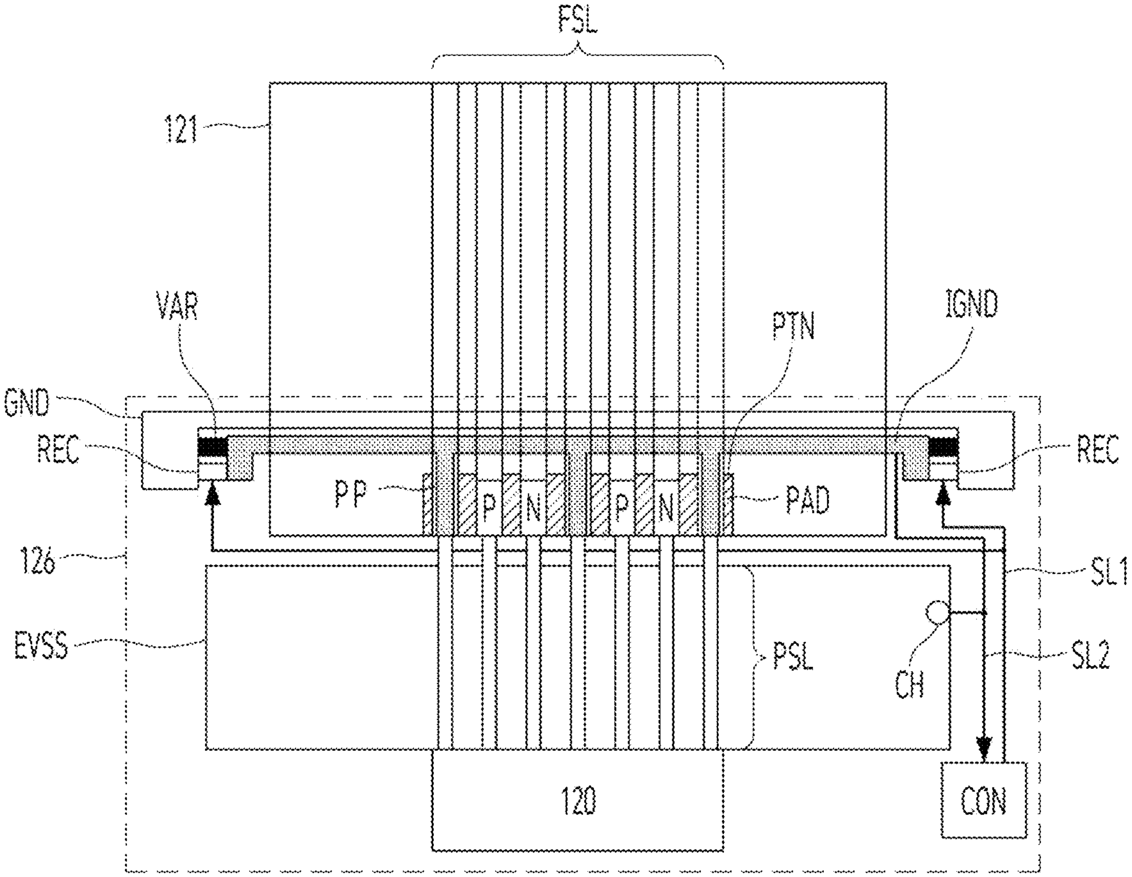
FIG. 21 is a diagram for describing a resonance controller according to a modification example.

FIG. 21 is a diagram for describing a resonance controller according to a modification example.

As illustrated in FIG. 21, according to the modification example, a resonance controller CON, REC, VAR, EVSS, and PTN may include a pattern portion PTN where a metal layer has been removed, based on a region where a pad part PAD is formed. The pattern portion PTN may be provided by removing a metal layer configuring a low voltage electrode part EVSS or a ground electrode GND disposed in a second layer of a first circuit board 126. The pattern portion PTN may compensate for a region, where an impedance is reduced, of the pad part PAD. The pattern portion PTN may increase or decrease an impedance formed in a first connector.

Table 2 may show a simulation result using a first circuit unit included in a resonance controller, and Table 3 may show a simulation result using a second circuit unit included in the resonance controller.

Referring to the following Table 2 and Table 3, the resonance controller according to an embodiment may improve EMI by about 3.8 dB through parasitic resonance avoidance control using the first circuit unit and may improve EMI by about 3 dB through parasitic resonance magnitude control using the second circuit unit.

TABLE 2

| | | 0Ω | 100 pF | 1 nF | 10 nF | 100 nF | Other |
|---|---|---|---|---|---|---|---|
| Parameter | Frequency (GHz) | 2.46 | 2.49 | 2.5 | 2.49 | 2.44 | |
| | Loss (dB) | −0.92 | −1.13 | −1.23 | −1.15 | −0.84 | @2.5 GHz |
| | Isolation characteristic (dB) | −31.18 | −26.51 | −26.41 | −26.38 | −33.17 | |
| Radiation strength | Gain (dB) | −20.01 | −19.41 | −19.93 | −22.03 | −23.8 | |

TABLE 3

| | | 0Ω | 4.7Ω | 10Ω | 20Ω | 30Ω | Other |
|---|---|---|---|---|---|---|---|
| Parameter | Frequency (GHz) | 2.46 | 2.46 | 2.46 | 2.46 | 2.46 | |
| | Loss (dB) | −0.92 | −0.92 | −0.84 | −0.81 | −0.85 | @2.5 GHz |
| | Isolation characteristic (dB) | −31.18 | −32.23 | −34.2 | −39.38 | −43.22 | |
| Radiation strength | Gain (dB) | −20.01 | −22.97 | −21.21 | −20.97 | −19.87 | |

Hereinabove, the present disclosure may allow an EPI frequency to be unsynchronized with a parasitic resonance frequency of a connector (for example, a cable) when transmitting a signal through an EPI, thereby minimizing an EMI problem. Also, the present disclosure may control a parasitic resonance frequency of the connector (avoid or distribute a parasitic resonance frequency), based on a sensing type or a non-sensing type. Also, the present disclosure may decrease EMI by using a resonance controller, and thus, may secure the degree of freedom in design for a length of the connector and may remove a subsidiary material such as a fixing tape, thereby reducing the manufacturing cost.

The effects according to the present disclosure are not limited to the above examples, and other various effects may be included in the specification.

While the present disclosure has been particularly shown and described with reference to exemplary embodiments thereof, it will be understood by those of ordinary skill in the art that various changes in form and details may be made therein without departing from the spirit and scope of the present disclosure including those of the following claims.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display apparatus comprising: a first circuit board configured to output a timing control signal; a connector connected to the first circuit board; a second circuit board connected to the first circuit board, through the connector; a controller disposed on the first circuit board and configured to output a control signal; a pad part on which the connector is attached in the first circuit board; and a parasitic resonance control circuit configured to vary a parasitic value of the connector, based on the control signal output from the controller, the parasitic resonance control circuit including a second circuit unit deposited at two ends of the pad part, the circuit unit configured to vary a parasitic resonance magnitude of the connector, a low voltage electrode part and a ground pad part disposed at a periphery of the connector, wherein the controller is configured to senses a voltage from at least one of the low voltage electrode part or the ground pad part to obtain a sensing value, wherein the ground pad part includes an island shape and is isolated from a ground electrode disposed in the first circuit board.

2. The display apparatus of claim 1, wherein the controller is configured to control a voltage applied to the parasitic resonance control circuit to vary the parasitic resonance magnitude of the connector.

3. The display apparatus of claim 1, wherein the parasitic resonance control circuit further comprises a first circuit unit including a varactor diode where a capacitance is variable.

4. The display apparatus of claim 1, wherein the controller is configured to sense a voltage from a conductor disposed at a periphery of the connector to obtain a sensing value and to output the control signal, based on the obtained sensing value.

5. The display apparatus of claim 3, wherein first circuit unit is disposed at the two ends of the pad part.

6. The display apparatus of claim 1, wherein the ground pad part is disposed in a first layer of the first circuit board, and the low voltage electrode part is disposed in a second layer of the first circuit board.

7. The display apparatus of claim 5, wherein the first circuit board comprises a pattern portion formed by removing a metal layer disposed in a second layer of the first circuit board, based on a region where the pad part is formed.

8. The display apparatus of claim 1, wherein the second circuit unit includes a field effect transistor configured to operate as a resistor in a deep triode region.

9. The display apparatus of claim 1, wherein the controller is configured to output the control signal as random bits.

* * * * *